US009372609B2

(12) United States Patent
Tijssen

(10) Patent No.: US 9,372,609 B2
(45) Date of Patent: Jun. 21, 2016

(54) ASSET-BASED ANIMATION TIMELINES

(71) Applicant: Adobe Systems Incorporated, San Jose, CA (US)

(72) Inventor: Remon Tijssen, Mill Valley, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 183 days.

(21) Appl. No.: 14/244,624

(22) Filed: Apr. 3, 2014

(65) Prior Publication Data

US 2015/0286376 A1    Oct. 8, 2015

(51) Int. Cl.
*G06F 3/0484* (2013.01)
*G11B 27/031* (2006.01)
*G06F 3/0488* (2013.01)

(52) U.S. Cl.
CPC .......... *G06F 3/04845* (2013.01); *G06F 3/0488* (2013.01); *G06F 3/04842* (2013.01); *G11B 27/031* (2013.01)

(58) Field of Classification Search
None
See application file for complete search history.

(56) References Cited

U.S. PATENT DOCUMENTS

| | | | |
|---|---|---|---|
| 7,805,678 B1 | 9/2010 | Niles et al. | |
| 2005/0097471 A1* | 5/2005 | Faraday | G06F 3/0486 715/723 |
| 2011/0078560 A1* | 3/2011 | Weeldreyer | G06F 17/214 715/255 |
| 2012/0063747 A1* | 3/2012 | Braun | G11B 27/034 386/280 |
| 2013/0127875 A1 | 5/2013 | Blas, Jr. et al. | |

OTHER PUBLICATIONS

"Microsoft Powerpoint 2010 Product Guide," http://www.microsoft.com/en-us/download/details.aspx?id=10994, Jul. 13, 2010.*
How-To Geek, "Create a Customized Tab on the Office 2010 Ribbon," http://www.howtogeek.com/howto/12337/create-a-customized-tab-on-the-office-2010-ribbon Mar. 8, 2010.*
Aaron Rykhus, "How to play a video across multiple slides in PowerPoint 2010," http://blogs.technet.com/b/bgp/archive/2010/09/01/howtoplayavideoacrossmultiplesslidesinpowerpoint2010.aspx.*
Adobe After Effects Help and Tutorials (Jan. 2014).

* cited by examiner

*Primary Examiner* — Kee M Tung
*Assistant Examiner* — Nicholas R Wilson
(74) *Attorney, Agent, or Firm* — Finch & Maloney PLLC

(57) ABSTRACT

An asset-based animation timeline is provided that displays information for a selected visual asset, such as information associated with one or more motion effects which are applied to the asset. Because the asset-based animation timeline is configured to provide information for only the selected visual asset, complexities associated with overlapping assets, sequential assets, and large numbers of assets are eliminated. The asset-based animation timelines disclosed herein can be configured to provide direct access to tools that allow a user to manipulate the motion effects that are applied to a given asset and to add additional motion effects to a selected asset. Animation timelines for other assets included in a given animation production can be accessed by selecting a different asset from an animation canvas. A user can interact with the various asset-based animation timelines disclosed herein using gestures, thus making such embodiments particularly well-suited for implementation using a touch-based interface.

19 Claims, 14 Drawing Sheets

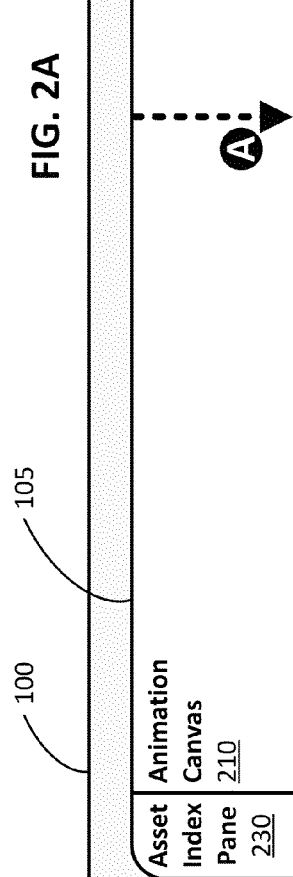

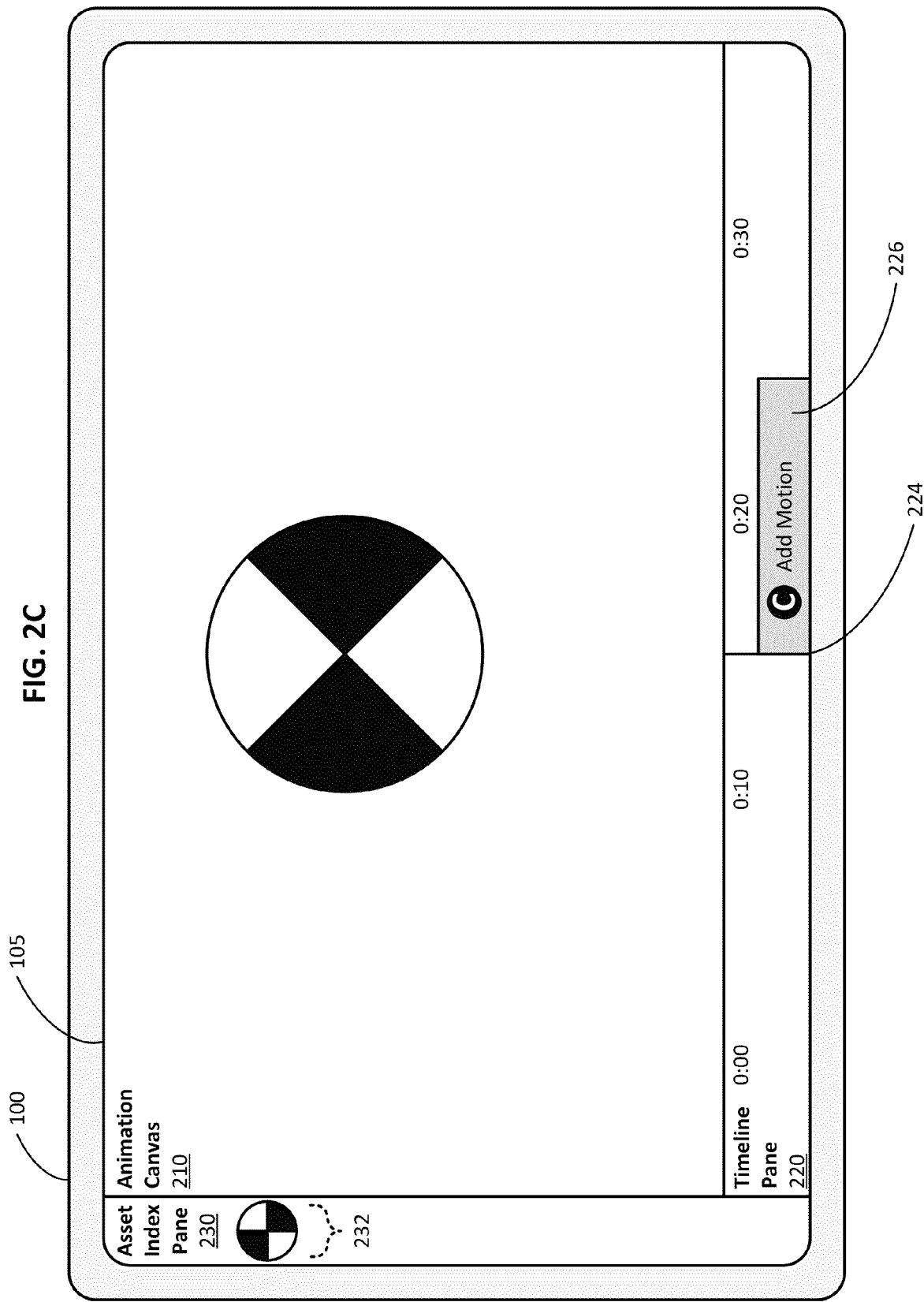

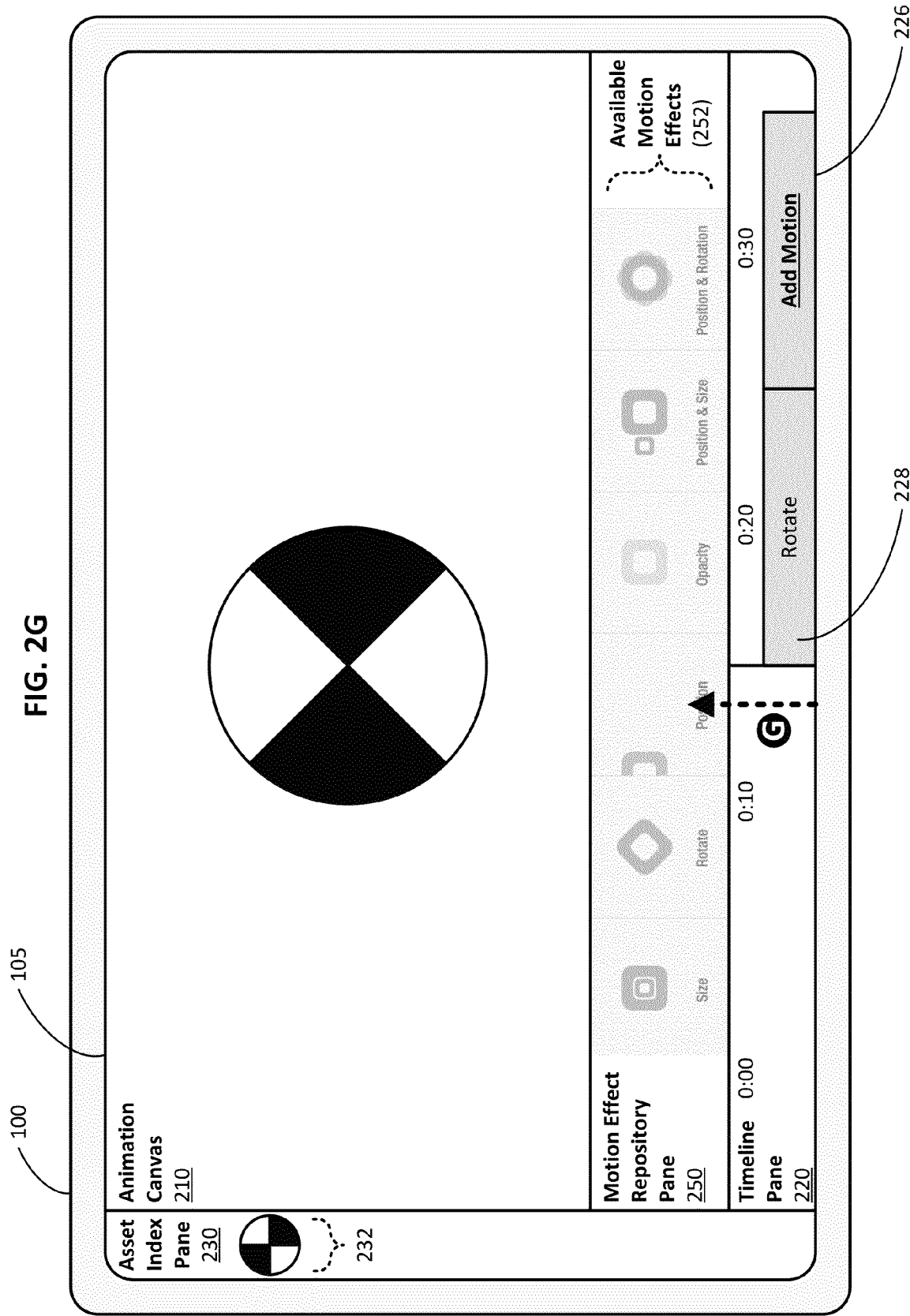

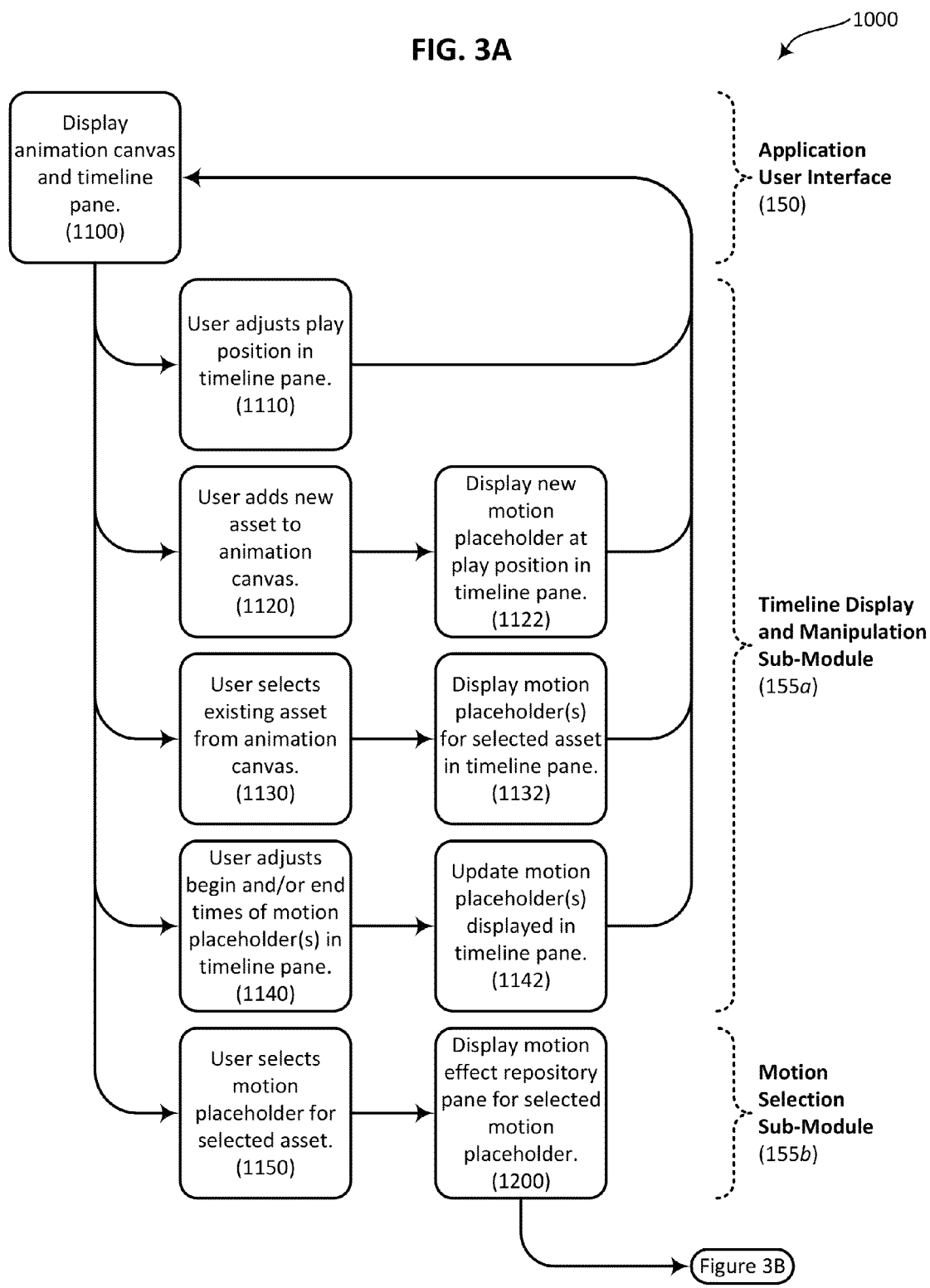

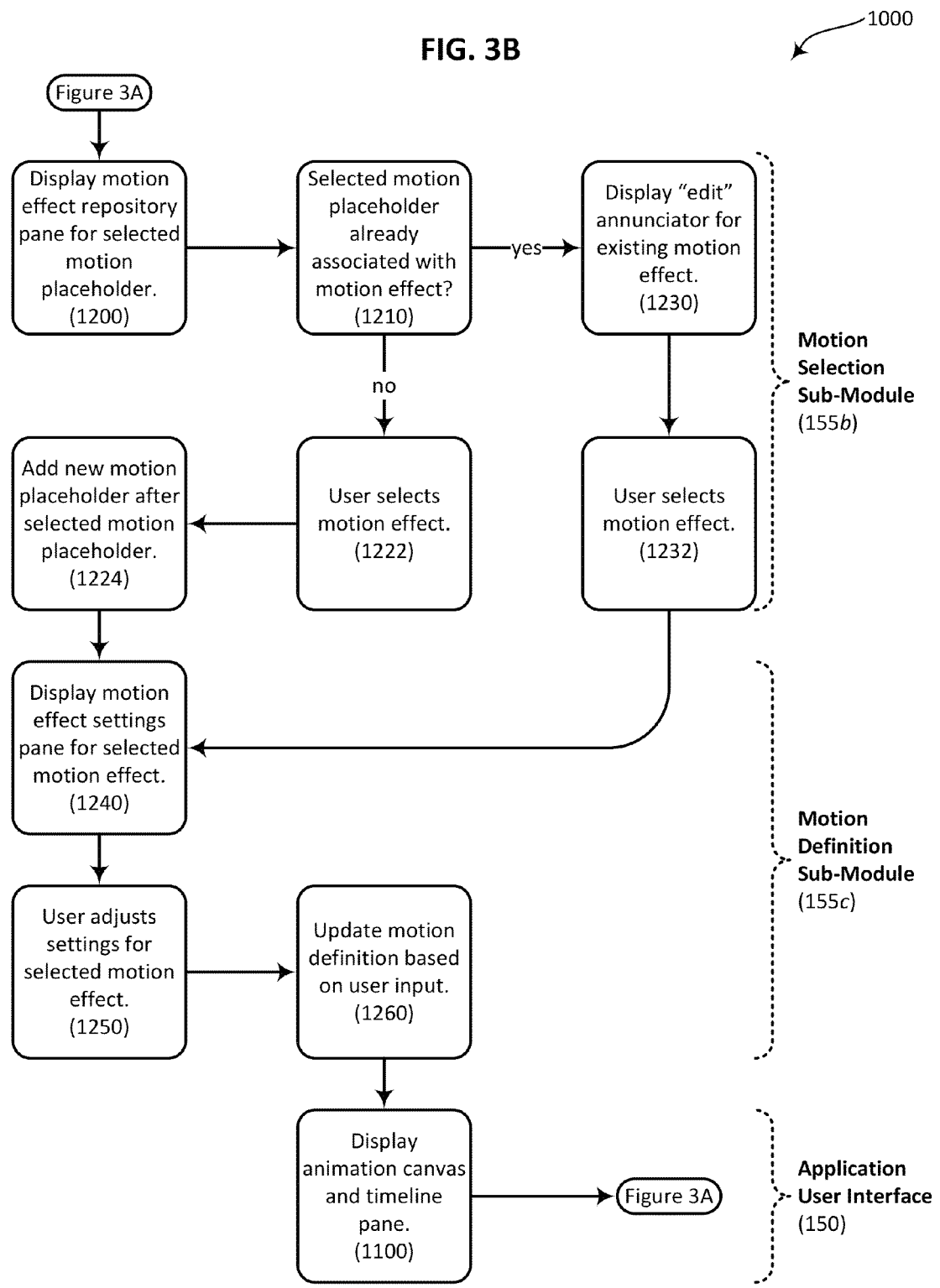

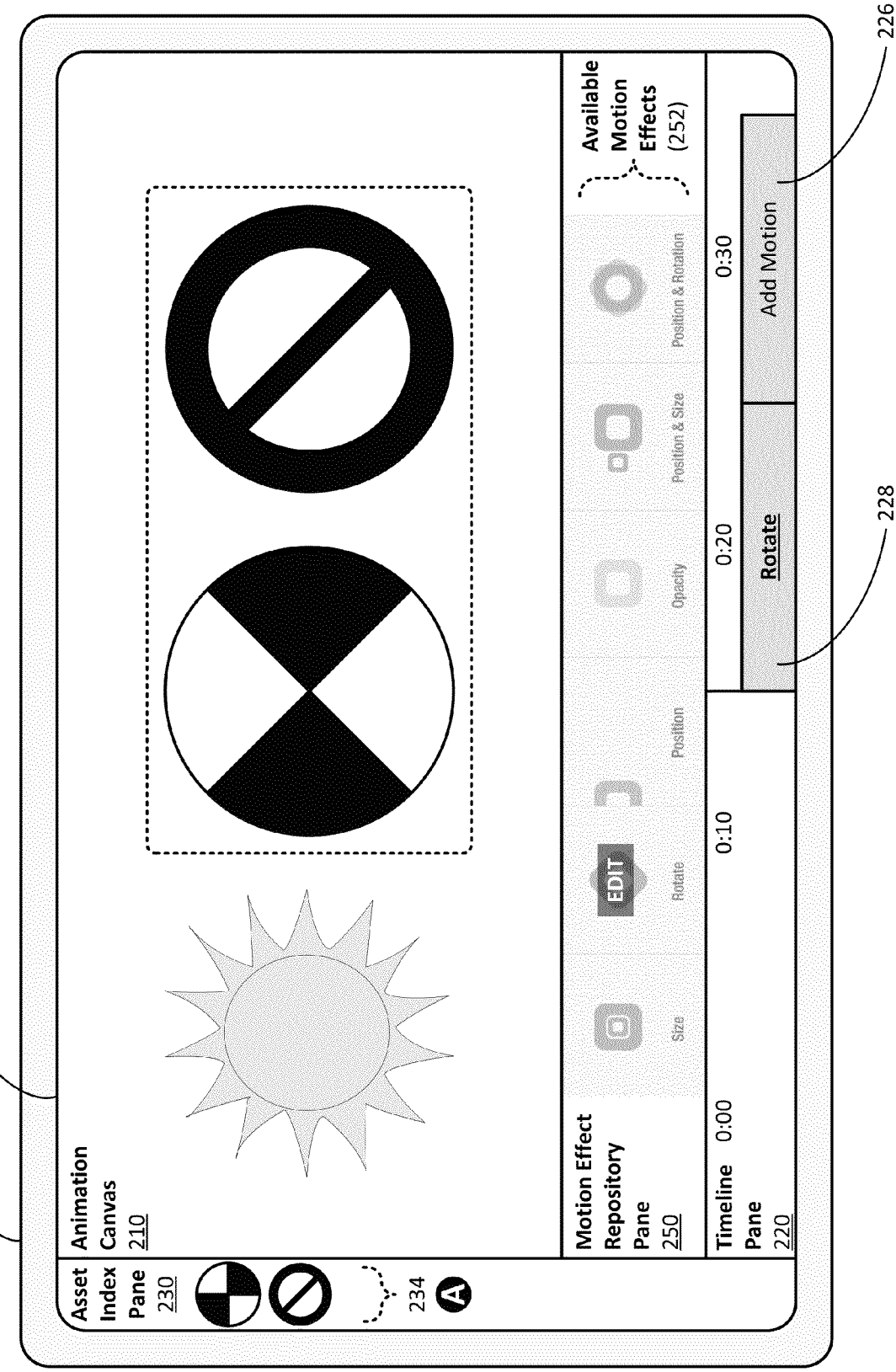

ASSET-BASED ANIMATION TIMELINES

FIELD OF THE INVENTION

This disclosure relates generally to a graphical user interface for a computing device, and more specifically to a graphical user interface for a motion editing software application that can be used to manipulate computer-controlled animation and other visual effects.

BACKGROUND

Modern motion editing software applications provide a number of tools and user interface elements that enable users to create and manipulate highly complex animation productions. One example of such a user interface element is an animation timeline that provides a graphical representation of the various visual assets comprising an animation production. An animation timeline typically includes a horizontal timeline axis and a number of horizontal bars positioned along the axis. Each of the horizontal bars represents a particular visual asset forming part of the animation production, and also provides a visual indication of the start and end points of the asset with respect to the timeline axis. A user can manipulate the bars to shorten or lengthen corresponding assets. Examples of commercially available motion editing software applications that provide some form of animation timeline interface include Final Cut Pro® (Apple Inc., Cupertino, Calif.), Windows Movie Maker (Microsoft Corporation, Redmond, Wash.) and After Effects® (Adobe Systems Incorporated, San Jose, Calif.).

BRIEF DESCRIPTION OF THE DRAWINGS

FIG. 2A illustrates an example motion editing software graphical user interface in accordance with an embodiment of the present invention, wherein a swiping gesture can be used to access an otherwise hidden asset repository pane.

FIG. 2C illustrates an example motion editing software graphical user interface in accordance with an embodiment of the present invention, wherein selecting a motion placeholder allows an otherwise hidden motion effect repository pane to be accessed.

FIG. 2G illustrates an example motion editing software graphical user interface in accordance with an embodiment of the present invention, wherein a swiping gesture can be used to add a concurrent motion effect to a timeline pane.

FIGS. 3A and 3B comprise a flowchart illustrating an example technique for using the motion editing software graphical user interface of FIGS. 2A through 2H to define and/or manipulate an animation production.

FIG. 5A illustrates an example motion editing software graphical user interface in accordance with an embodiment of the present invention, wherein a group of visual assets are displayed in an asset index pane.

DETAILED DESCRIPTION

Figure 1A:
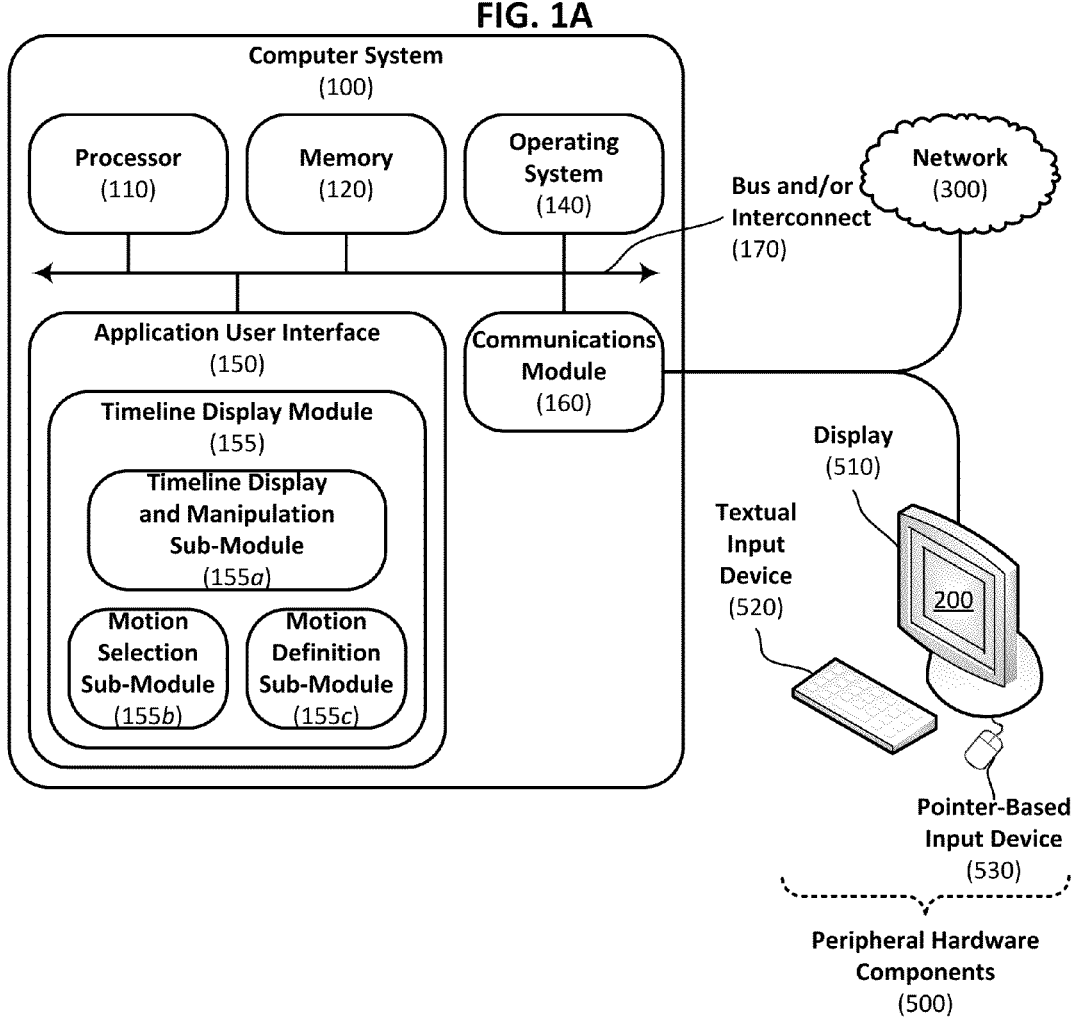
FIG. 1A is a block diagram schematically illustrating selected components of a computer system that can be used to implement certain embodiments of the present invention.

Animation timeline interfaces facilitate the creation and manipulation of highly complex animation productions. However, the animation timeline interfaces provided by existing motion editing software applications suffer from a number of shortcomings. For example, certain timeline interfaces represent multiple visual assets by displaying multiple timeline bars in a single horizontal row. This makes it difficult to distinguish between overlapping assets and sequentially arranged assets. Other timeline interfaces represent multiple visual assets by displaying multiple timeline bars in separate vertically stacked rows, thus more clearly illustrating the relationship between overlapping and sequential assets. However, this approach can become cumbersome for animation projects that include large numbers of assets since the resulting timeline can become excessively deep in the vertical dimension. In either configuration, these animation timelines are not well-suited for representing different motion effects that are applied to a single visual asset. In some cases, these complexities have been addressed by nesting multiple assets into a single aggregated timeline bar. However, if a user wishes to manipulate any of the nested assets, the aggregated timeline bar must be expanded. This solution does not provide the user with an indication of the contents of an unexpanded aggregated timeline bar, and does not provide any mechanism or directly editing such contents. These complexities are further compounded when information regarding the properties of the various visual assets—such as the application of multiple concurrent motion effects—is added to such a timeline interface. These complexities also make it difficult or impossible to implement existing timeline interfaces using a touch sensitive display since the small size of the timeline elements tends to be unworkable when applied to touch-based interfaces. Therefore a simplified interface for displaying timeline information for visual assets that still enables users to leverage the functionality of a motion editing software application is desired.

Thus, and in accordance with certain embodiments of the present invention, techniques are disclosed herein that simplify the process of creating and manipulating animation productions using motion editing software applications. In such embodiments an asset-based animation timeline is provided that displays information for a selected visual asset, such as information associated with one or more motion effects which are applied to the asset. Because the asset-based animation timeline is configured to provide information for only the selected visual asset, the aforementioned complexities associated with overlapping assets, sequential assets, and large numbers of assets are eliminated. The asset-based animation timelines disclosed herein can be configured to provide direct access to tools that allow a user to manipulate the motion effects that are applied to a given asset and to add additional motion effects to a selected asset. Animation timelines for other assets included in a given animation production can be accessed by selecting a different asset from an animation canvas. In certain embodiments a user can interact with the various asset-based animation timelines disclosed herein using gestures, thus making such embodiments particularly well-suited for implementation using a touch-based and/or portable interface, such as is often provided with a tablet computer. Additional functionalities are provided in other embodiments, and numerous alternative configurations and variations will be apparent in light of this disclosure.

For example, in one embodiment an asset-based animation timeline is provided as part of a graphical user interface that is associated with a motion editing software application, and that is displayed using a touchscreen. The user interface includes an animation canvas upon which one or more visual assets are displayed. The user interface also includes an animation timeline. Upon selection of a visual asset that is displayed on the animation canvas, a horizontal bar is displayed on the animation timeline. The horizontal bar represents one or more motion effects which have been applied to the selected visual asset. If no motion effects have been applied to the selected visual asset, the horizontal bar represents a placeholder through which a new motion effect can be applied. Selection of a motion placeholder enables a user to add a new motion effect to the selected asset or modify a particular motion effect which was previously applied to the selected asset. The motion placeholder itself can be manipulated to adjust the timing of a particular motion effect. Selecting an alternative visual asset from the animation canvas enables a user to view and/or manipulate motion effects associated with the alternative asset. Other functionalities may be provided in other embodiments, as will be described in turn.

As used herein, the term "asset" refers, in addition to its ordinary meaning, to an object which is included in, and which forms a part of, an animation, motion graphics, or other visual presentation. Examples of such objects include images represented by a raster array of pixels, images represented by one or more vectors, an animated sequence of raster or vector images, textual objects, and hyperlinks. An asset may be stored in a compressed format to reduce the computing resources required to store, process and/or transmit the asset. In some cases one or more motion effects may be applied to an asset, such that the asset appears to move, rotate, become transparent, or otherwise change with the progression of time. An asset may exist transiently, and thus may appear for only a brief period of time as compared to the full length of a visual presentation. In the context of this disclosure, an asset may also be referred to as a visual asset and/or an animation asset.

As used herein, the term "animation presentation" refers, in addition to its ordinary meaning, to a visual presentation that includes one or more visual assets which change with the progression of time. An animation presentation may be stored in digital format and may be created and manipulated using any suitable motion editing software application. In some cases an animation presentation may comprise a sequence of frames that, when displayed in sufficiently rapid succession, create the appearance of motion. In other cases, an animation presentation may include motion that is defined by a mathematical relationship or other algorithm. In the context of this disclosure, an animation presentation may also be referred to as an animation production, a motion graphics presentation and/or a visual presentation.

As used herein, the term "timeline" refers, in addition to its ordinary meaning, to an axis that provides a graphical representation of the progression of time, and that can be used to illustrate how assets are temporally arranged in an animation presentation. While a timeline axis can be arranged with any arbitrary orientation, horizontal axes are often used. The arrangement of an animation asset in a timeline can be represented, for example, by a bar positioned along the axis, with the ends of the bar being positioned at points on the axis that correspond to the times at which the asset appears and disappears from the animation presentation. In some cases multiple bars can be positioned along a timeline, wherein each of the multiple bars corresponds to a different concept, such as a different animation asset, or in some cases, a different motion effect that is applied to a single animation asset.

System Architecture

Figure 1B:
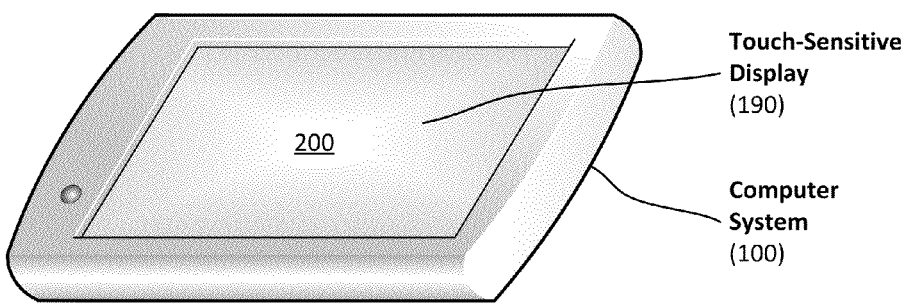
FIG. 1B illustrates an example embodiment of the computer system of FIG. 1A, wherein the computer system is implemented as a tablet computer having a touch-sensitive display.

FIG. 1A is a block diagram schematically illustrating selected components of a computer system 100 that can be used to implement certain embodiments of the present invention. Computer system 100 may comprise, for example, one or more devices selected from a desktop or laptop computer, a workstation, a tablet computer, a smartphone, a handheld computer, a set-top box, or any other suitable computing device. For example, FIG. 1B illustrates an example embodiment of computer system 100, wherein the computer system is implemented as a tablet computer having a touch-sensitive display 190. In other embodiments a combination of different devices may be used as computer system 100. As illustrated, computer system 100 includes, among other things, a processor 110, a memory 120, an operating system 140, an application user interface 150, and a communications module 160. As can be further seen, a bus and/or interconnect 170 is also provided to allow for intra-device communications using, for example, communications module 160.

Computer system 100 is optionally coupled to a network 300 to allow for communications with other computing devices, such as a server, a media repository, or a content management system. Network 300 may be a local area network (such as a home-based or office network), a wide area network (such as the Internet) or a combination of such networks, whether public, private, or both. In some cases access to computing resources on a given network may require credentials such as usernames, passwords, and/or any other suitable security mechanism. Other embodiments of computer system 100 may not be coupled to any network and may just operate as a stand-alone computing system. In certain embodiments computer system 100 includes, or is coupled to, certain peripheral hardware components 500, such as a display 510, a textual input device 520, and/or a pointer-based input device 530. Other componentry and functionality not reflected in the schematic block diagram of FIG. 1A will be apparent in light of this disclosure, and it will be appreciated that the claimed invention is not intended to be limited to any particular hardware components or configuration of such components.

Still referring to the example embodiment illustrated in FIG. 1A, processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disk drive, a universal serial bus (USB) drive, flash memory, and/or random access memory. Operating system 140 may comprise any suitable operating system, such as Google Android (Google Inc., Mountain View, Calif.), Microsoft Windows (Microsoft Corporation, Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently-developed platform. Communications module 160 can be any appropriate network chip or chipset which allows for wired and/or wireless connection to network 300 or peripheral hardware components 500 such that computer system 100 can communicate with other local and/or remote computing systems, servers, peripheral hardware, and/or resources.

Application user interface 150 is configured to provide information to, and to receive information and commands from, a user. It can be implemented or used in conjunction with a variety of suitable input/output peripheral hardware components 500 that can be coupled to or that otherwise form part of computer system 100. As illustrated in FIG. 1A, examples of such peripheral hardware components 500 include display 510 (such as a touchscreen display), textual input device 520 (such as a keyboard), and pointer-based input device 530 (such as a mouse or a stylus). Other input/output devices that may be used in other embodiments include a joystick, a touchpad, a speaker, and/or a microphone. For example, in one embodiment application user interface 150 is configured to render a user interface 200 on peripheral display 510, as illustrated in FIG. 1A. In other embodiments application user interface 150 is configured to render user interface 200 on a touch-sensitive display 190 of a tablet computer, as illustrated in FIG. 1B. In certain embodiments application user interface 150 is installed local to computer system 100, as illustrated in the example embodiment of FIG. 1A. In alternative embodiments computer system 100 can be implemented in a client-server arrangement wherein at least some portions of the application user interface 150 are provided to a client computer system using an applet, such as a JavaScript applet, or other downloadable module. Such a remotely accessible module can be provisioned in real-time in response to a request from the client computing system for access to a given server having resources that are of interest to a user of the client computing system. For example, a user of a tablet computer may invoke application user interface 150 upon accessing a client-based repository of animation presentations and/or other content that the user wishes to manipulate. In such embodiments the server can be local to network 300 or remotely coupled to network 300 by one or more other networks and/or communication channels. In any such stand-alone or networked computing scenarios, application user interface 150 may be implemented with any appropriate interface technologies and/or hardware componentry that enable a user to interact with computing system 100.

In certain embodiments application user interface includes a timeline display module 155 that is configured to provide one or more of the various timeline display and manipulation functionalities disclosed herein. In particular, timeline display module 155 can be configured to facilitate the process of using a motion editing software application to manipulate the visual assets that comprise a computer-controlled animation production. Examples of such motion editing software applications include movie making applications, video editing applications, slideshow applications, and animation applications. In other embodiments the functionalities described herein can be embedded within, or are otherwise accessible via, other software applications that are capable of working with or otherwise manipulating animated content, such as desktop publishing applications, word processing applications, presentation applications, electronic mail applications, and web content generation applications. In general, application user interface 150 can be incorporated into such applications, or can otherwise be used in conjunction with such an application. Likewise, in an alternative embodiment timeline display module 155 is integrated into a given software application, rather than integrating the entire application user interface 150. In still other embodiments, timeline display module 155 can be implemented as a distinct executable application that works in conjunction with application user interface 150 and/or with another target application. Timeline display module 155 can also be used to manipulate computer-controlled visual effects in conjunction with operating system 140, such as where operating system 140 itself is configured to provide visual effects. In general, it will be appreciated that modern computer systems and computer applications often allow users to manipulate animated visual effects for a wide variety of purposes, and in particular, not only for content generation but also for screen appearance customization. The animation timelines disclosed herein can thus be used for such diverse purposes.

Referring again to the example embodiment illustrated in FIG. 1A, the functionality of timeline display module 155 can be implemented using, for example, sub-modules including a timeline display and manipulation sub-module 155a configured to display an asset-based animation timeline, a motion selection sub-module 155b configured to display one or more motion effects which many be applied to a selected animation asset, and a motion definition sub-module 155c configured to display one or more motion effect controls that manipulate a selected motion effect. Other sub-modules may additionally or alternatively be included in other embodiments. For example, in other embodiments the asset-based animation timelines disclosed herein may be implemented in one or more dedicated modules with which application user interface 150 interacts. The functionality associated with the asset-based animation timeline sub-modules illustrated in FIG. 1A will be disclosed in turn.

The various embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the asset-based timeline user interface methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment, the system can be hosted on a given website and implemented using JavaScript or another suitable browser-based technology, for example.

The functionalities disclosed herein can optionally be incorporated into software applications other than those specifically configured for the manipulation of animated presentations. For example, a word processing application may be capable of importing and embedding animated assets into a text-based document. In such case, the word processing application can be configured to implement certain of the functionalities disclosed herein to further manipulate the imported animated assets. The computer software applications disclosed herein may therefore include a number of different modules, sub-modules, or other components of distinct functionality that can provide information to, or receive information from, still other components and/or services. These modules can be used, for example, to communicate with input and/or output devices such as a pointer device, a display screen, a touch sensitive surface, a printer, and/or any other suitable input/output device. Other components and functionality not reflected in the illustrations will be apparent in light of this disclosure, and it will be appreciated that the claimed invention is not intended to be limited to any particular hardware or software configuration. Thus in other embodiments the configuration illustrated in FIG. 1A may comprise additional, fewer, or alternative components.

The aforementioned non-transitory computer readable medium may be any suitable medium for storing digital information, such as a hard drive, a server, a flash memory, and/or random access memory. In alternative embodiments, the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present invention is not intended to be limited to any particular system architecture.

User Interface

FIGS. 2A through 2H illustrate example motion editing software graphical user interfaces configured in accordance with various embodiments of the present invention. As illustrated in FIG. 1A, application user interface 150 can be configured to cause user interface 200 to appear on a display 510 that is coupled to, or that otherwise forms part of computer system 100. In the example embodiments illustrated in FIGS. 2A through 2H, computer system 100 comprises a tablet computer having an integrated touch sensitive display 105. It will be appreciated that the user interfaces illustrated in FIGS. 2A through 2H can also be rendered by other types of computer systems, including desktop computing systems having a display screen that is physically separate from, but nevertheless in communication with, a central processing unit. User interface 200 can be displayed in response to a user command associated with manipulation of an animation presentation, such as a command to create or edit an animation presentation.

As illustrated in FIG. 2A, computer system 100 comprises a tablet computer that includes touch sensitive display 105. Touch sensitive display 105 is capable of displaying a plurality of user interface elements that, taken together, comprise user interface 200. Touch sensitive display 105 is also capable of detecting and responding to gestures made by tapping, swiping, or otherwise touching a surface of display 105 with a finger, stylus, or other implement. In the illustrated embodiment, user interface 200 includes an animation canvas 210, a timeline pane 220, and an asset index pane 230. Animation canvas 210 can be configured to display one or more visual elements that comprise an animation presentation, and asset index pane 230 can be configured to display thumbnail representations of visual assets which have been selected by a user. Asset index pane 230 is therefore particularly useful for applications where a user wishes to select multiple visual assets, such as for the purpose of applying a common action to a group of assets. In the embodiment illustrated in FIG. 2A, no visual assets have been added to animation canvas 210, and therefore asset index pane 230 is empty as well.

Still referring to FIG. 2A, user interface 200 also includes a timeline pane 220, which forms a horizontal axis representing the progression of time. Timeline pane 220 includes one or more time labels 222 and a current time indicator 224 that provides an indication of what portion of an animation presentation is currently being displayed in animation canvas 210. For example, in FIG. 2A, current time indicator 224 is positioned at approximately 0:15, meaning that the scene illustrated in animation canvas 210 will be displayed about fifteen seconds into the animation presentation. Thus, if a visual asset were to be added to animation canvas 210 illustrated in FIG. 2A, this visual asset would be displayed about fifteen seconds into the animation presentation. Other portions of timeline pane 220 can be viewed by scrolling to the left or right, such as by performing a left- or right-swiping gesture on timeline pane 220. For example, if a user wishes to see how the animation presentation appears at twenty seconds into the animation presentation, a leftward swiping gesture can be performed such that current time indicator 224 is positioned at 00:20.

Figure 2B:
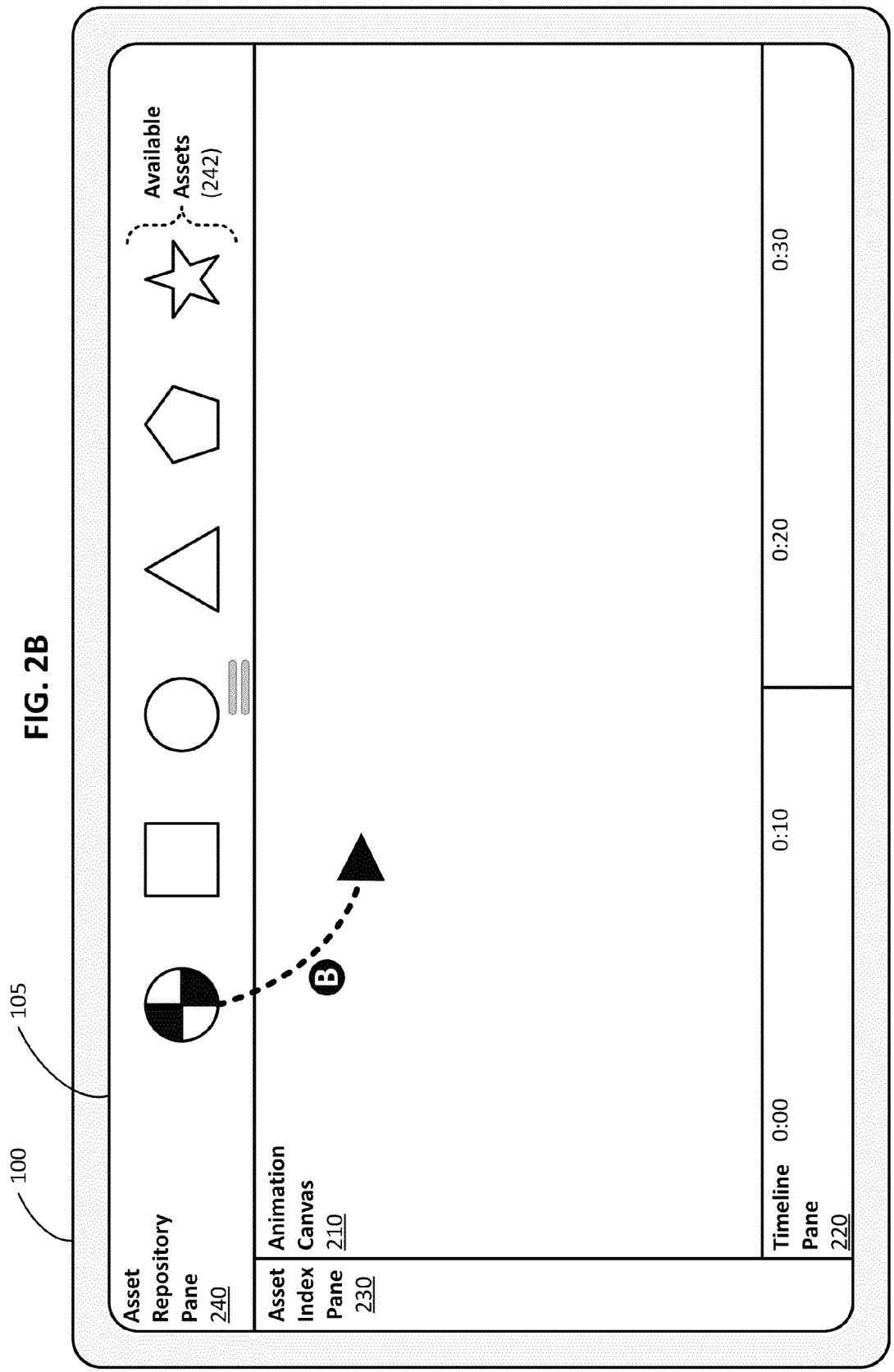
FIG. 2B illustrates an example motion editing software graphical user interface in accordance with an embodiment of the present invention, wherein a drag-and-drop gesture can be used to add a visual asset to an animation canvas.

In certain embodiments an asset repository pane can be displayed by swiping inward from a predetermined edge of touch sensitive display 105, such as indicated by gesture A in FIG. 2A. FIG. 2B illustrates the result of performing such a gesture. In such embodiments an asset repository pane 240 displays a plurality of available assets 242. Available assets 242 may be aggregated from a digital asset repository stored in memory 120 and/or a networked asset store, and may include any of a variety of asset types. Where all available assets 242 cannot be displayed simultaneously in asset repository pane 240, any suitable user interface technique can be used to access those assets which cannot be displayed, including by scrolling, by expanding asset repository pane 240, or by providing an asset search tool. Once a user identifies an asset that is to be added to animation canvas 210, the user may add the asset by performing a drag-and-drop gesture B to place the selected asset at an appropriate position on animation canvas 210, as illustrated in FIG. 2B.

FIG. 2C illustrates the results of performing drag-and-drop gesture B. The selected asset now appears on animation canvas 210, and as a newly placed asset, is considered by user interface to be a selected asset. In such embodiments, an asset selection manifests in at least two ways. First, the selected asset appears in asset index pane 230. In the example embodiment illustrated in FIG. 2C, where animation canvas includes only one selected asset, this produces the trivial result whereby the one selected asset also appears in asset index pane 230. However, in other embodiments where animation canvas may include tens, hundreds, or more assets, asset index pane 230 may provide a useful listing of which one or more of the several assets are selected. Thus, in general, asset index pane 230 can be understood as displaying thumbnail images corresponding to a group of selected assets 232.

Figure 2D:
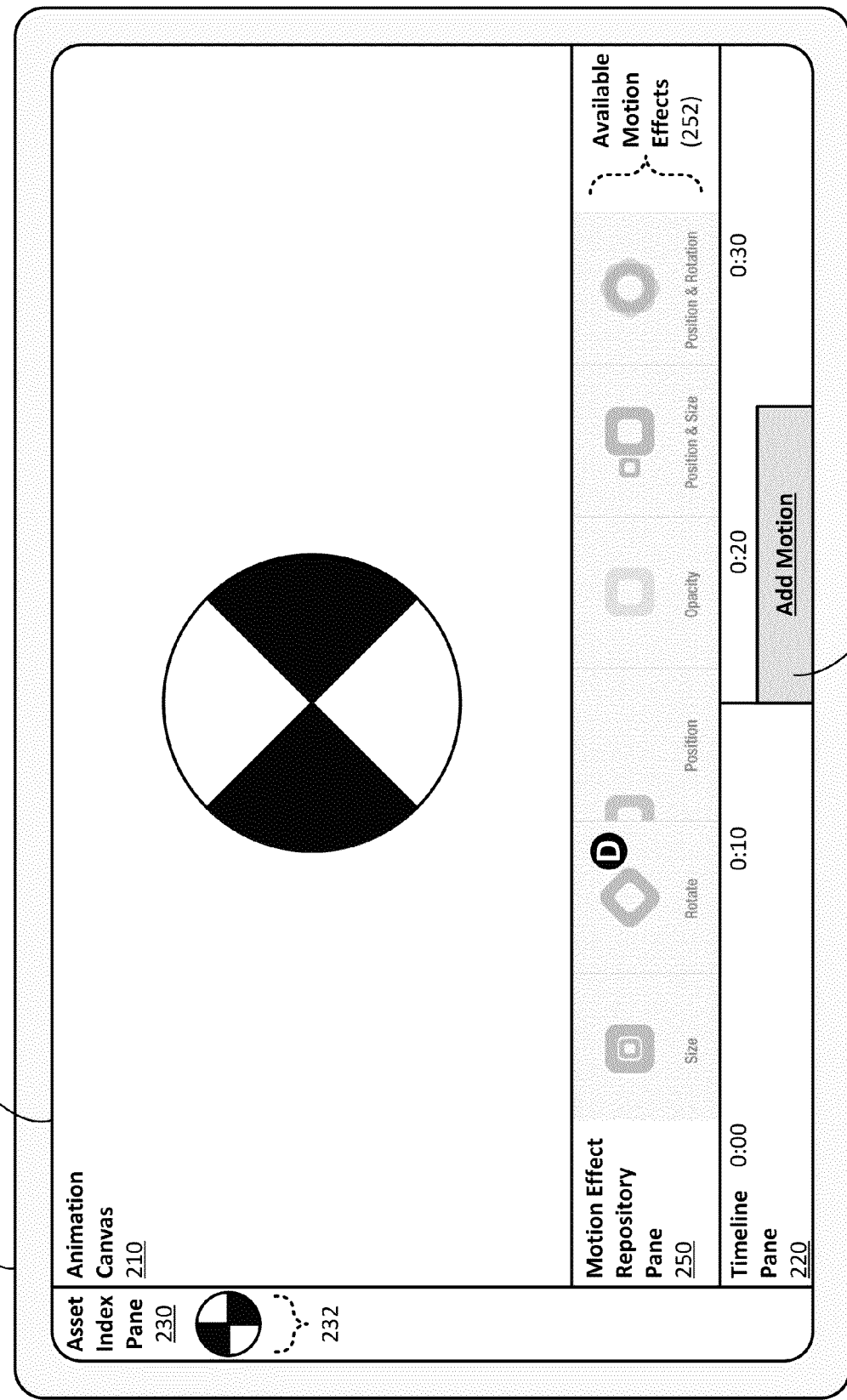
FIG. 2D illustrates an example motion editing software graphical user interface in accordance with an embodiment of the present invention, wherein a motion effect can be applied to a visual asset by making a selection from a motion effect repository pane.

The second way an asset selection manifests is the display of a horizontal bar in timeline pane 220, the horizontal bar representing a motion placeholder corresponding to the selected asset. In particular, in the example embodiment illustrated in FIG. 2C, where the asset selection occurs as a result of a new asset being added to animation canvas 210, a new motion placeholder 226 is added to timeline pane 220 at the position of current time indicator 224. In particular, because the newly added asset is not associated with any motion effect, new motion placeholder 226 serves as a placeholder through which a new motion effect can be applied. However, where a selected asset is already associated with a motion effect, the motion placeholder displayed in timeline pane 220 can be associated with, and optionally labeled with, the corresponding motion effect. This allows a user to easily and quickly see what motion effects, if any, are associated with a given visual asset by simply selecting that asset from animation canvas 210. Such a selection can be made, for example, by tapping the selected asset.

Where a selected asset is not associated with any motion effect, new motion placeholder 226 can be selected to add a motion effect to the selected asset. See gesture C illustrated in FIG. 2C. Thus new motion placeholder 226 can be labeled "Add Motion" in such embodiments. FIG. 2D illustrates the result of performing a selection gesture C. In particular, FIG. 2D illustrates a motion effect repository pane 250 having a plurality of icons corresponding to motion effects 252 which are available to be applied to the selected visual asset. Examples of such motion effects include a sizing effect (wherein an object becomes larger or smaller), a rotation effect (wherein an object rotates), a position effect (wherein an object moves), an opacity effect (wherein an object becomes transparent or opaque). Effects such as these can be combined, such as in the case of a position and size effect (wherein an object moves and becomes larger or smaller simultaneously) or a position and rotation effect (wherein an object moves and rotates simultaneously). Available motion effects 252 may be aggregated from a repository stored in memory 120 and/or a networked motion effect store. Where all available motion effects 252 cannot be displayed simultaneously in motion effect repository pane 250, any suitable user interface technique can be used to access those assets which cannot be displayed, including by scrolling, by expanding motion effect repository pane 250, or by providing a motion effect search tool. As illustrated in FIG. 2D, the appearance of new motion placeholder 226 may be modified in response to selection gesture C, thus providing an indication that a selected motion effect will be applied in a time period corresponding to the position of new motion placeholder 226 in timeline pane 220.

Figure 2E:
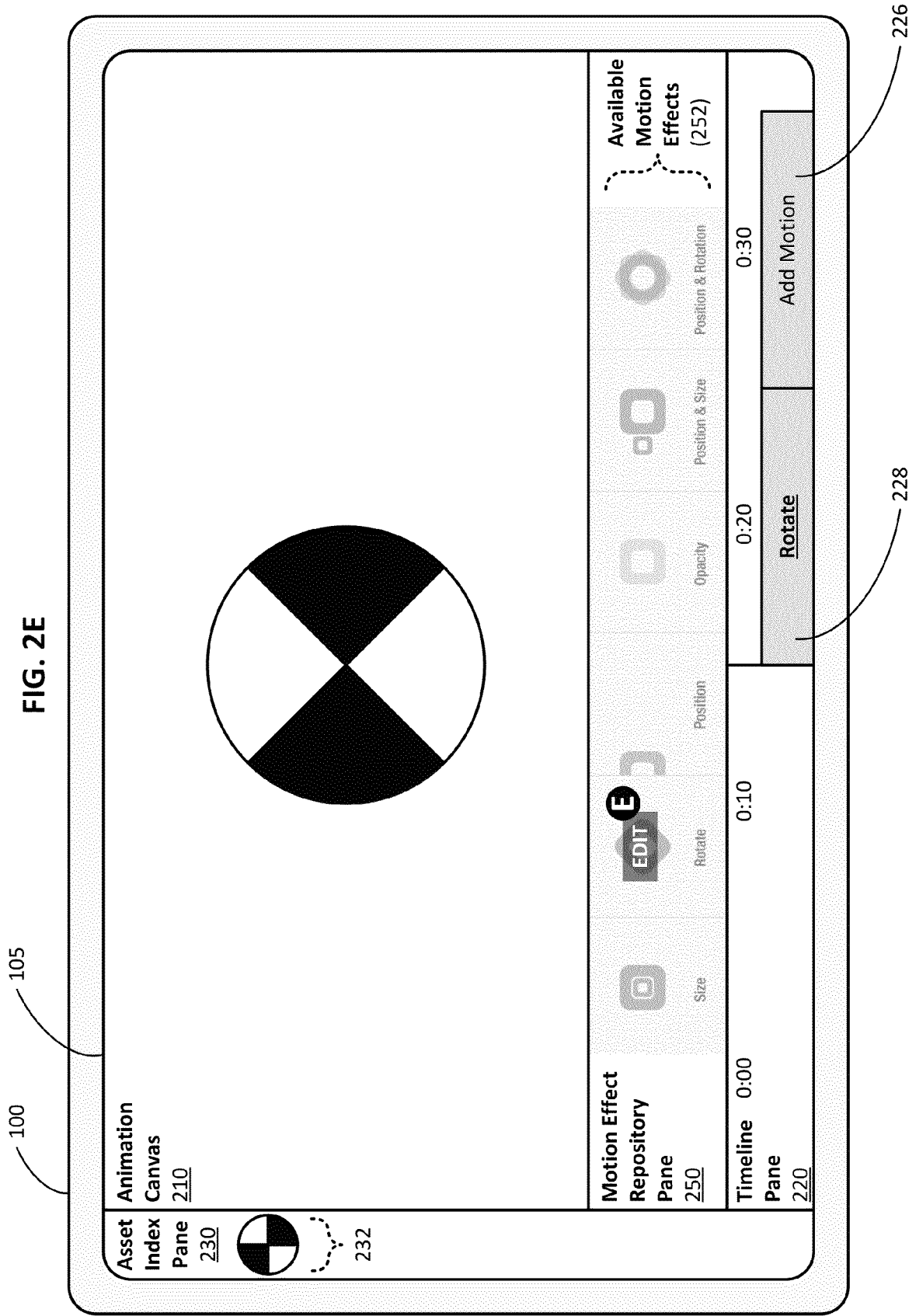
FIG. 2E illustrates an example motion editing software graphical user interface in accordance with an embodiment of the present invention, wherein selecting a previously selected motion effect from a motion effect repository pane allows an otherwise hidden motion effect settings pane to be accessed.

A desired motion effect can be selected, for example, by tapping the corresponding icon in motion effect repository pane 250, as indicated by gesture D in FIG. 2D. The result of such a selection is illustrated in FIG. 2E. In particular, a selected existing motion placeholder 228 is displayed in timeline pane 220. New motion placeholder 226, which is now unselected, has been shifted to the right, later in time, and thus remains available to serve as a placeholder through which yet another new motion effect can be applied. Existing motion placeholder 228 is labeled with the selected motion effect ("Rotate" in the example embodiment illustrated in FIG. 2E). In addition, an "Edit" annunciator is added to the icon corresponding to the selected motion effect in motion effect repository pane 250, thereby providing an indication that the properties of the selected motion effect can be edited by selecting the icon a second time, as indicated by tapping gesture E illustrated in FIG. 2E.

Figure 2F:
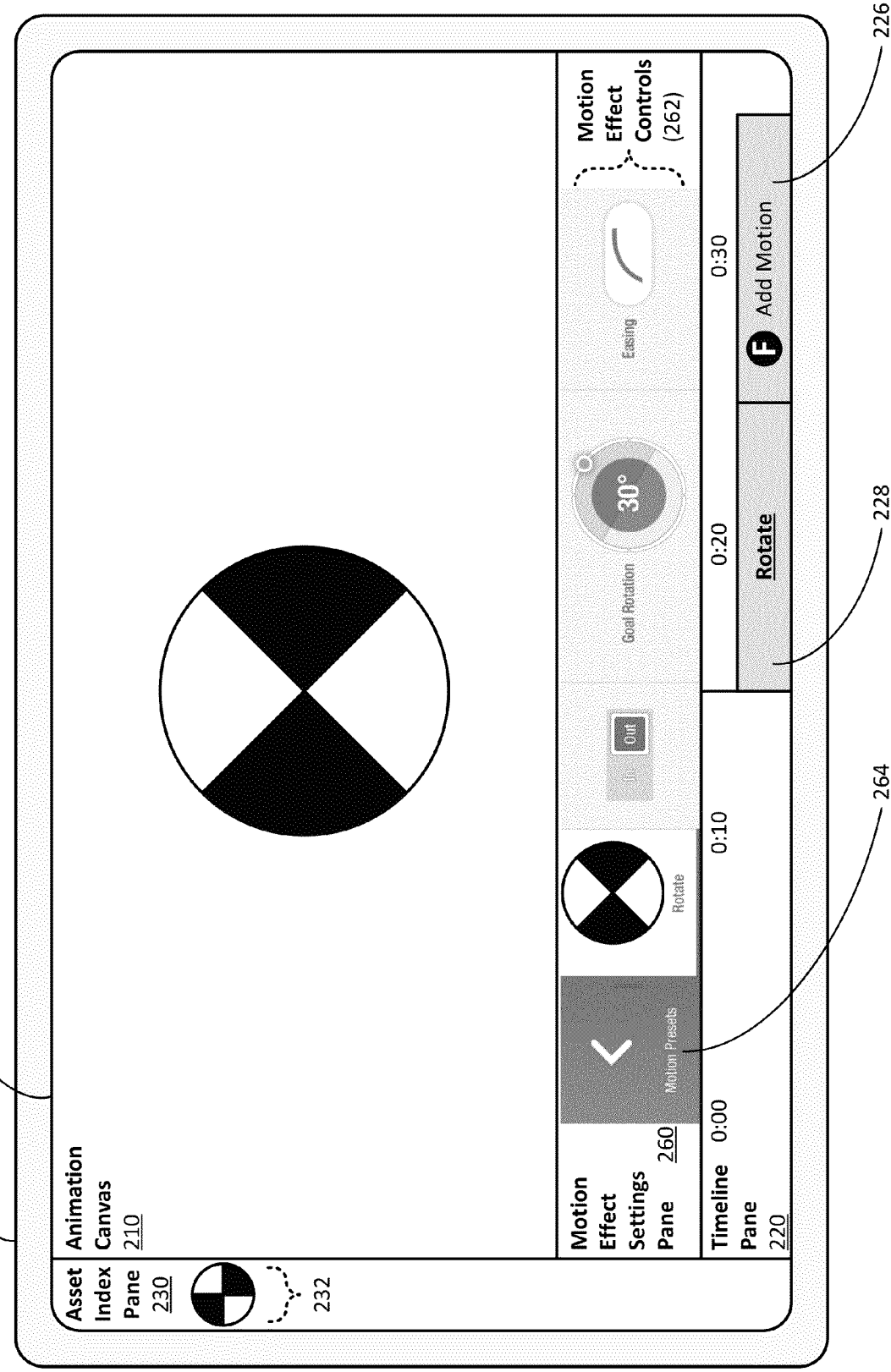
FIG. 2F illustrates an example motion editing software graphical user interface in accordance with an embodiment of the present invention, wherein selecting a subsequent motion placeholder allows an otherwise hidden motion effect repository pane to be accessed.

FIG. 2F illustrates the result of performing tapping gesture E. In particular, FIG. 2F illustrates a motion effect settings pane 260 having a plurality of icons corresponding to motion effect controls 262 associated with the selected motion effect. For example, in the case of a rotation motion effect, motion effect controls 262 can be used to control an initial angle and a target angle of rotation, as well as the angular acceleration. The motion effect controls 262 displayed in motion effect settings pane may vary depending on the particular motion effect selected from motion effect repository pane 250. In certain embodiments such controls are configured to be responsive to gestures provided via touch sensitive display 105. If a user wishes to change the type of motion effect, motion effect repository pane 250 can be accessed by selecting a navigate back button 264. If a user wishes to manipulate a motion effect associated with a different asset, selection of the different asset from animation canvas 210 will cause one or more new and/or existing motion placeholders 226, 228 associated with the different asset to appear in timeline pane, as illustrated in FIG. 2C.

Because new motion placeholder 226 remains visible, additional motion effects can be applied to the selected asset by performing a tapping gesture F on new motion placeholder 226. FIG. 2G illustrates the result of performing such a gesture. In particular, FIG. 2G illustrates motion effect repository pane 250 listing one or more available motion effects 252. The appearance of new motion placeholder 226 may be modified in response to selection gesture F, thus providing an indication that a selected motion effect will be applied to a time period corresponding to the position of new motion placeholder 226 in timeline pane 220. In certain embodiments the available motion effects 252 may be specifically configured for use given the earlier presence of existing motion placeholder 228. For example, an opacity motion effect may be configured by default to cause an object to fade from being completely opaque to being completely transparent. This is because the selected new motion placeholder 226 appears after existing motion placeholder 228, and it makes sense that an existing object would fade away from view rather than fading into view. However, if a user wishes to modify this default configuration, the properties of a particular motion effect can be manipulated via motion effect settings pane 260, as described herein in conjunction with FIG. 2F.

Figure 2H:
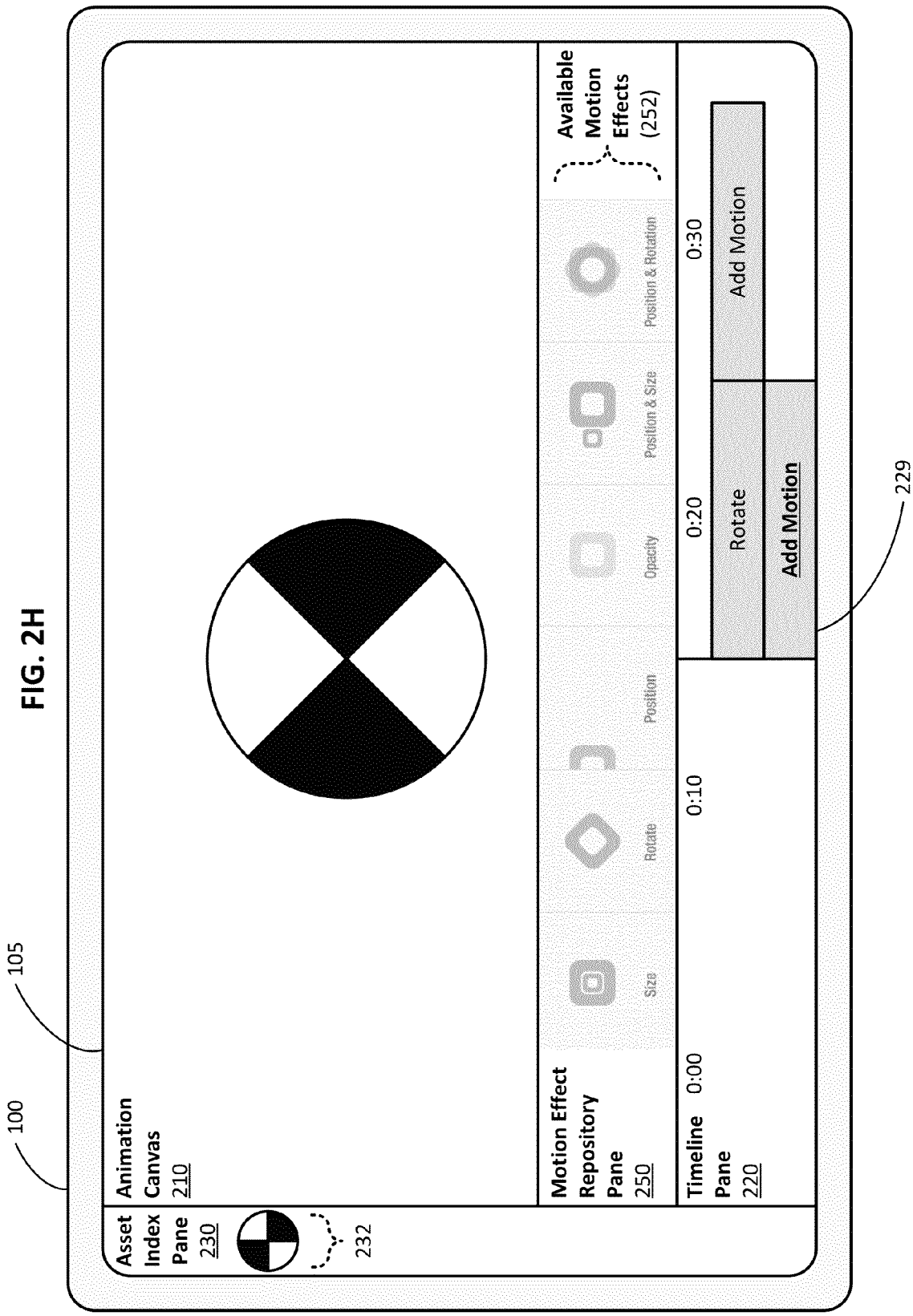
FIG. 2H illustrates an example motion editing software graphical user interface in accordance with an embodiment of the present invention, wherein concurrent motion effects are represented in an animation timeline frame.

FIG. 2G illustrates an embodiment wherein two motion effects are applied to a selected visual asset sequentially. That is, once the rotation effect corresponding to existing motion placeholder 228 is complete, a second motion effect is applied. In some cases a user may wish to apply multiple motion effects to the selected visual asset simultaneously. Application of a simultaneous motion effect can be achieved by swiping inward from an edge of touch sensitive display 105 that is adjacent to timeline pane 220, such as indicated by gesture G in FIG. 2G. FIG. 2H illustrates the result of performing such a gesture. In such embodiments timeline pane 220 is expanded to accommodate a new concurrent motion placeholder 229. Concurrent motion placeholder 229 serves as a placeholder through which new motion effect can be applied concurrent to an existing motion effect, such as the rotation effect illustrated in FIG. 2H. Selection of the new concurrent motion placeholder 229 causes motion effect repository pane 250 be displayed again, from which a user can select a desired motion effect. In general, selection of a given visual asset from animation canvas 210 will cause timeline pane 220 to expand to accommodate motion placeholders associated with the selected asset. Only displaying placeholders associated with a selected asset advantageously simplifies the resulting animation timeline, thereby making it easier for a user to understand which motion effects are applied to which visual assets in a given animation production.

Methodology

FIGS. 3A and 3B comprise a flowchart illustrating an example method 1000 for using the motion editing software graphical user interface of FIGS. 2A through 2H to define and/or manipulate an animation production. Method 1000 comprises a number of phases and sub-processes, the sequence of which may vary from one embodiment to another. However, when considered in the aggregate, these phases and sub-processes form an asset-based timeline user interface method 1000 which is responsive to user commands in accordance with certain of the embodiments disclosed herein. These methodologies can be implemented, for example, using the system architecture illustrated in FIG. 1A and described herein. However other system architectures can be used in other embodiments, as will be apparent in light of this disclosure. To this end, the correlation of the various functionalities shown in FIGS. 3A and 3B to the specific components illustrated in FIG. 1A, as described herein, is not intended to imply any structural and/or use limitations. Rather, other embodiments may include varying degrees of integration where multiple functionalities are performed by one system or by separate systems. For example, in an alternative embodiment motion selection and motion definition functionality is provided by an integrated sub-module that provides the functionality associated with motion selection sub-module 155b and motion definition sub-module 155c illustrated in FIG. 1A. Thus other embodiments may have fewer or more modules and/or sub-modules depending on the granularity of a particular implementation. Numerous variations and alternative configurations will be apparent in light of this disclosure.

The user interface method 1000 commences with using application user interface 150 to display user interface 200 comprising animation canvas 210 and timeline pane 220. See reference numeral 1100 in FIG. 3A. User interface 200 can be displayed, for example, using a device such as touch sensitive display 105, and can be configured to respond to a number of different user inputs. For example, a user may adjust a play position in timeline pane 220 by swiping timeline pane 220 leftwards or rightwards, thereby causing current time indicator 224 to be aligned with a desired play position. See reference numeral 1110 in FIG. 3A. Timeline display and manipulation sub-module 155a can be used to update the appearance of timeline pane 220 in response to such input. After the play position has been adjusted to the user's preference, user interface 200 can be configured to respond to further user input as described herein.

A user may also add new visual assets to animation canvas 210, for example by dragging-and-dropping assets from asset repository pane 240. See reference numeral 1120 in FIG. 3A, as well as gesture B in FIG. 2B. New visual assets may also be added using other techniques, such as by accessing an "Import Asset" functionality via a menu bar user interface element, or by snapping a photograph using a digital camera associated with computer system 100. Regardless of the way in which a new visual asset is selected, user interface 200 can respond to such selection by displaying the new asset at the appropriate location on animation canvas 210 and displaying new motion placeholder 226 at current time indicator 224 in timeline pane 220. See reference numeral 1122 in FIG. 3A as well as FIG. 2C. Since the new asset can be considered to be a selected asset, in certain embodiments a thumbnail representation of the new asset is also displayed in asset index pane 230. In such embodiments timeline display and manipulation sub-module 155a can be configured to respond to the addition of new visual assets by updating animation canvas 210, timeline pane 220 and asset index pane 230 as described herein.

After the new asset has been added, user interface 200 can be configured to respond to further user input as described herein.

A user may also select an existing visual asset from animation canvas 210, for example by tapping a displayed asset. See reference numeral 1130 in FIG. 3A. User interface 200 can be configured to respond to such selection by displaying one or more new and/or existing motion placeholders 226, 228 corresponding to the selected asset in timeline pane 220. See reference numeral 1132 in FIG. 3A. Where the selected asset is already associated within one or more motion effects, one or more existing motion placeholders 228 corresponding to such existing motion effects can be displayed in timeline pane 220. Where multiple motion effects are applied to a selected asset simultaneously, timeline pane 220 can be expanded, such as expanded vertically, to accommodate temporally overlapping concurrent motion placeholders 229, such as illustrated in FIG. 2H. Where the selected asset is not associated with a motion effect, new motion placeholder 226 can be displayed in timeline pane 220, such as illustrated in FIG. 2C. In such embodiments timeline display and manipulation sub-module 155a can be configured to respond to the addition of new visual assets by updating the appearance of timeline pane 220 as described herein. After one or more appropriate new and/or existing motion placeholders 226, 228 are displayed in timeline pane 220, user interface 200 can be configured to respond to further user input as described herein.

A user may also adjust the beginning and/or ending times of one or more motion placeholders displayed in timeline pane 220. See reference numeral 1140 in FIG. 3A. This can be accomplished by performing a drag-and-drop gesture targeted on a selected end of the motion placeholder that is to be adjusted. For example, if the duration of a selected motion effect is to be extended by beginning earlier in time, a user can drag-and-drop the beginning (for example, left) side of the corresponding motion placeholder. Likewise, if the duration of a selected motion effect is to be shortened by beginning later in time, a user can drag-and-drop the beginning (for example, left), side of the corresponding motion placeholder. The ending (for example, right) side of a motion placeholder can likewise be adjusted with similar effect.

Where multiple motion effects are applied sequentially, modifying the timing of a first motion effect may or may not affect the timing of another motion effect applied to the same asset. For example, where the duration of an initial motion effect is extended by time t, a subsequent sequential motion effect could (a) become concurrent with the initial motion effect for duration t, or (b) remain sequential and have its onset delayed by duration t. In certain embodiments a user can indicate a selection between these options by using a different dragging gesture to manipulate the motion placeholder. For example, in one embodiment manipulating a motion placeholder with a one-finger dragging gesture causes the timing of other animation effects to be unaffected by such manipulation, while manipulating a motion placeholder with a two-finger dragging gesture causes the timing of other animation effects to be adjusted accordingly. In an alternative embodiment, conversion of sequentially-arranged motion effects to concurrently-arranged motion effects can be accomplished by performing a drag-and-drop gesture that is targeted on a central portion of a first motion placeholder and that moves the placeholder to a position above or below a second motion placeholder, thus positioning the motion placeholders temporally adjacent to each other, as illustrated in FIG. 2H. A pause in animation can be introduced by separating two motion placeholders by a gap in timeline pane 220.

Regardless of how concurrently-arranged motion effects are defined, it will be appreciated that use of asset-based animation timelines facilitate the process of isolating motion effect modifications to a particular animation asset. In particular, existing solutions do not provide a way to easily update other key frames within an animation without individually selecting such key frames.

User interface 200 can be configured to respond to such adjustments by updating the appearance of the manipulated motion placeholders displayed in timeline pane 220. See reference numeral 1142 in FIG. 3A. In particular, timeline display and manipulation sub-module 155a can be configured to respond to such adjustments and update the appearance of the motion placeholders as described herein. After such adjustments are made, and the corresponding elements in timeline page 220 are updated, user interface 200 can be configured to respond to further user input as described herein.

In certain embodiments, a user may select a motion placeholder for a given visual asset by tapping on the motion placeholder. See reference numeral 1150 in FIG. 3A and FIG. 2C. In such embodiments user interface 200 can be configured to respond to such a gesture by displaying motion effect repository pane 250 for the selected motion placeholder. See reference numeral 1200 in FIGS. 3A and 3B. A determination can be made with respect to whether the selected motion placeholder is already associated with a motion effect. See reference numeral 1210 in FIG. 3B. Where a motion placeholder that is not associated with a motion effect is selected, such as in the case of new motion placeholder 226, a user can associate motion placeholder 226 with a motion effect by tapping one of the displayed available motion effects 252. See reference numeral 1222 in FIG. 3B. In this case, new motion placeholder 226 is converted to existing motion placeholder 228, and another new motion placeholder 226 is added to timeline pane 220. See reference numeral 1224 in FIG. 3B. However, where a motion placeholder that is already associated with a motion effect is selected, such as in the case of existing motion placeholder 228, an "edit" annunciator can be displayed on the icon corresponding to the associated motion effect. See reference numeral 1230 in FIG. 3B and FIG. 2E. This allows a user to either select the previously associated motion effect or select a new motion effect. See reference numeral 1232 in FIG. 3B. The foregoing interactions with motion effect repository pane 250 can be controlled by motion selection sub-module 155b.

Regardless of whether or not the selected motion placeholder corresponds to new motion placeholder 226 or existing motion placeholder 228, selection of a motion effect from motion effect repository pane 250 can be configured to cause user interface to display motion effect settings pane 260 for the selected motion effect. See reference numeral 1240 in FIG. 3B and FIG. 2F. This provides a user with an opportunity to adjust properties associated with the selected motion effect. See reference numeral 1250 in FIG. 3B. The definition of the selected motion can be updated based on how a user manipulates motion effect controls 262. See reference numeral 1260 in FIG. 3B. These interactions with motion effect settings pane 260 can be controlled by motion definition sub-module 155c. After such interactions occur, and the corresponding elements in timeline pane 220 and/or animation canvas 210 are updated, user interface 200 can be configured to respond to further user input as described herein.

Figure 4:
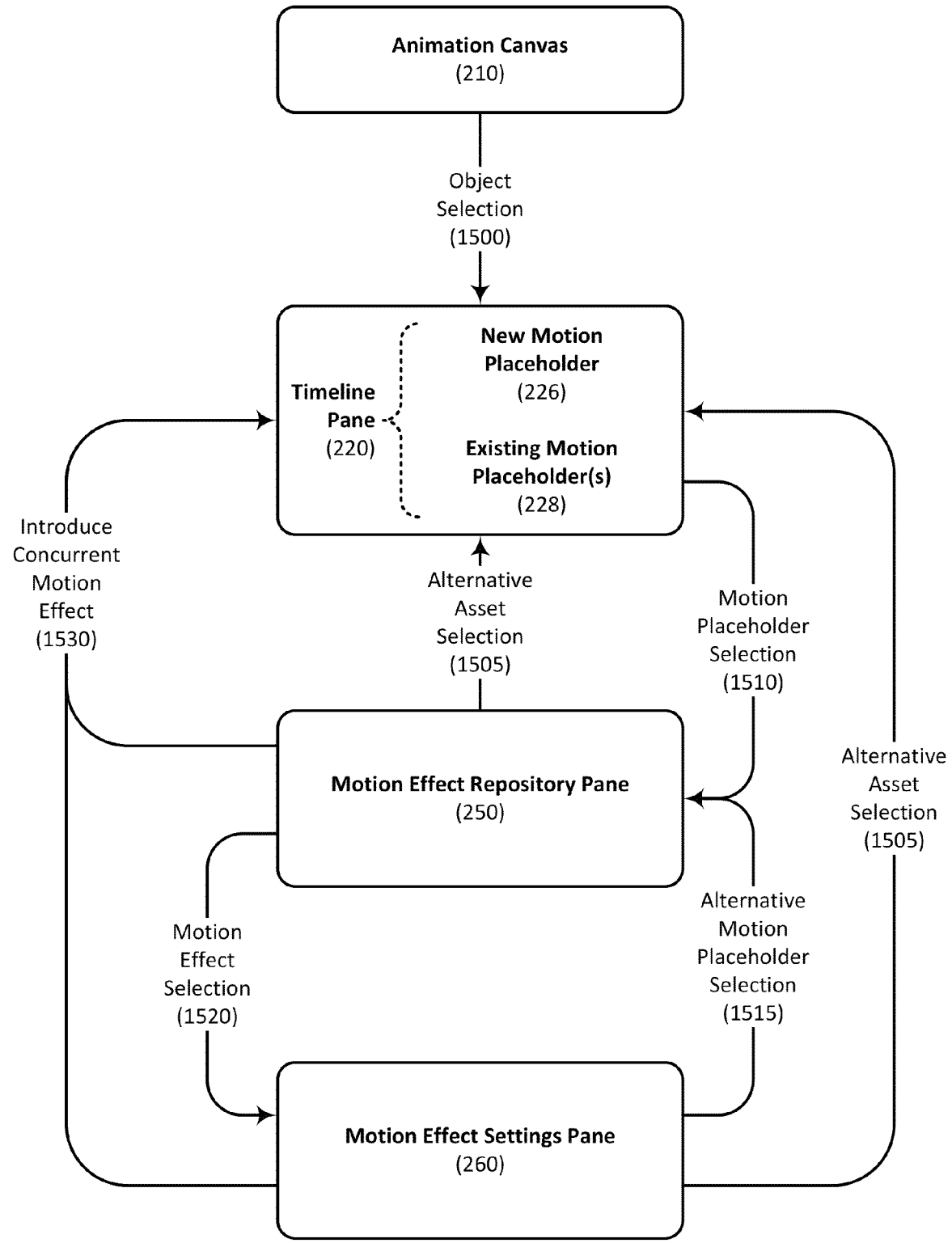
FIG. 4 is a workflow diagram illustrating methods for navigating between an animation canvas, motion placeholders, a motion effect repository pane, and a motion effect settings pane of the example motion editing software graphical user interface of FIGS. 2A through 2H.

Based on the foregoing, the user interface methodologies disclosed herein can be understood as providing a user with a simplified asset-based animation timeline that includes, in certain embodiments, animation canvas 200, one or more new and/or existing motion placeholders 226, 228, motion effect repository pane 250, and motion effect settings pane 260. These various components can be displayed and obscured depending on what functionality is being accessed by a particular user. For example, FIG. 4 is a workflow diagram illustrating methods for navigating amongst such components using the methodologies illustrated in FIGS. 3A and 3B. In particular, FIG. 4 illustrates that making an object selection 1500 from animation canvas 210 results in the display of a new motion placeholder 226 (where an object associated with no motion effect is selected) and optionally an existing motion placeholder 228 (where an object already associated with a motion effect is selected). In such embodiments motion placeholders 226, 228 are displayed in timeline pane 220. Annotating timeline pane 220 with motion placeholders associated with only a single visual asset advantageously simplifies the display of an animation timeline and allows a user to easily isolate the motion effects associated with a particular visual asset. A motion placeholder selection 1510 can be made from timeline pane 220. This causes motion effect repository pane 250 to be displayed.

A user can take several actions while motion effect repository pane 250 is displayed. For example, a user can make an alternative asset selection 1505 by selecting another asset from animation canvas 210. This causes one or more appropriate motion placeholders to be displayed, as described herein in the case of initial object selection 1500. The user can also make a motion effect selection 1520 by tapping a selected motion effect once (where the motion effect has already been applied to an asset; see gesture E in FIG. 2E) or twice (where no motion effect has been applied to an asset; see gestures D and E in FIGS. 2D and 2E). In either case, this causes motion effect settings pane 260 to be displayed. The user can also introduce a concurrent motion effect 1530 by swiping inward from an edge of touch sensitive display 105 that is adjacent to timeline pane 220, such as indicated by gesture G in FIG. 2G.

A user can likewise take several actions while motion effect settings pane 260 is displayed. For example, a user can make an alternative asset selection 1505 by selecting another asset from animation canvas 210. This causes one or more appropriate motion placeholders to be displayed, as described herein in the case of initial object selection 1500. The user can also make an alternative motion placeholder selection 1515 by selecting a different motion placeholder from timeline pane 220. This causes motion effect repository pane 250 to be displayed again, thereby prompting a user to select a motion effect to be applied to the newly selected motion placeholder. The user can also introduce a concurrent motion effect 1530 by swiping inward from an edge of touch sensitive display 105 that is adjacent to timeline pane 220, such as indicated by gesture G in FIG. 2G.

Figure 5B:
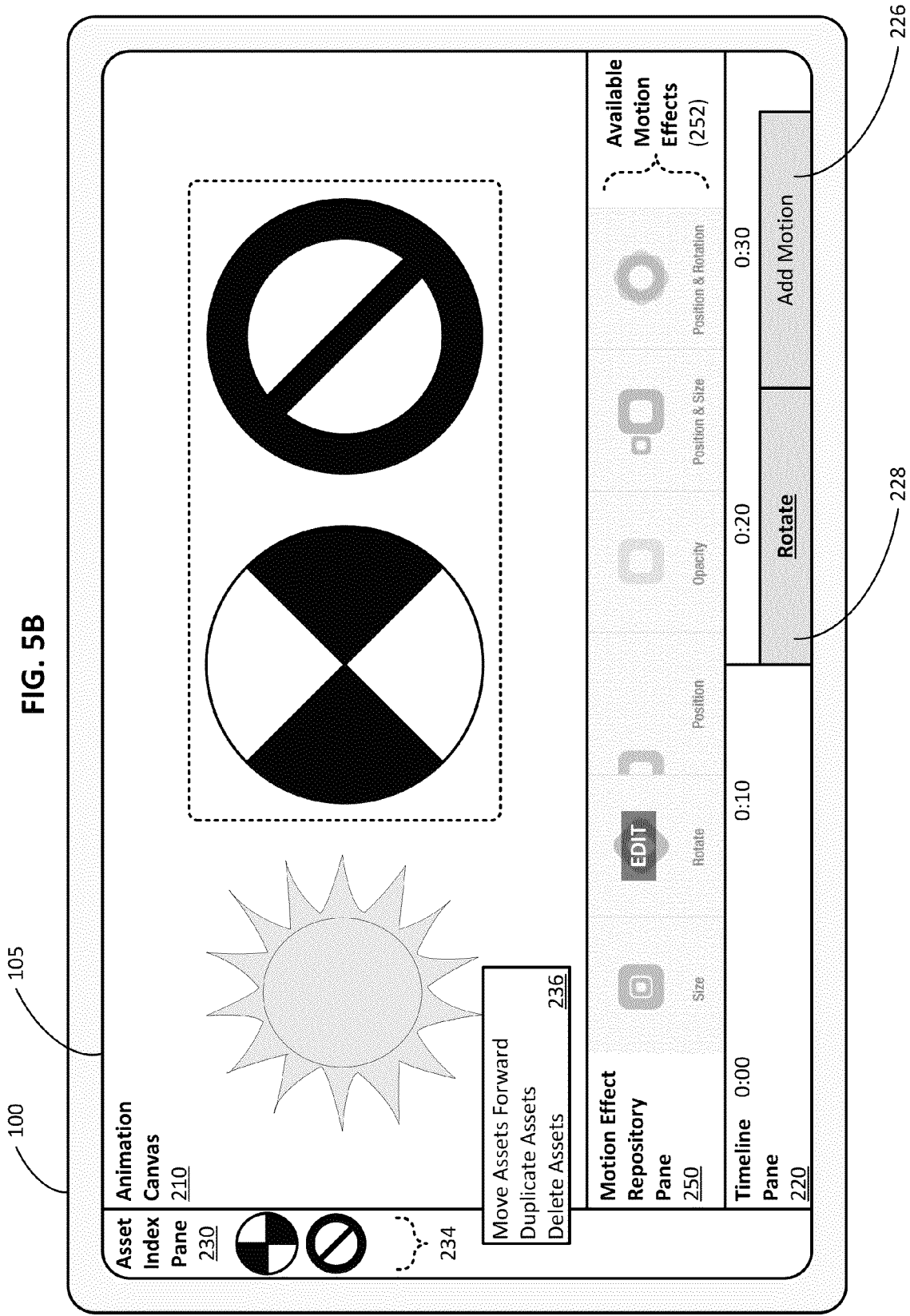
FIG. 5B illustrates an example motion editing software graphical user interface in accordance with an embodiment of the present invention, wherein a context menu provides access to supplemental asset manipulation functionality.

In certain embodiments asset index pane 230 can be used to apply motion effects or other actions to a plurality of visual assets. In such embodiments multiple assets appearing in animation canvas 210 can be grouped and subjected to common processing workflows. For example, FIG. 5A illustrates an example motion editing software graphical user interface in accordance with an embodiment of the present invention, wherein thumbnail images representing a group of selected visual assets 234 are displayed in asset index pane 230. In particular, the group has been defined based on a user's selection of two of three objects displayed in animation canvas 210. The grouped assets are associated with a rotation motion effect, as indicated by existing motion placeholder 228 in timeline pane 220. In certain embodiments performing a selection gesture within asset index pane, such as tapping gesture A, results in the display of a context menu. In particular, as illustrated in FIG. 5B, a context menu 236 can be configured to provide supplemental functionality such as moving the selected assets forward to a upper layer of animation canvas 210, duplicating the assets, and deleting the assets. Duplication of the assets can be configured to cause not only their physical appearance to be duplicated, but also to cause any motion effects associated with the selected assets to be duplicated as well. The duplicated assets may optionally be offset in time to reduce confusion with respect to the original assets. Once duplicated, the assets can be further manipulated as described herein. In certain embodiments context menu 236 may be provided with additional, alternative or fewer menu options, and thus it will be appreciated that the present invention is not intended to be limited to any particular set of functionality provided via context menu 236. Additionally, while context menu 236 illustrated in FIG. 5B is displayed in the context of a group of selected assets, in other applications the functionality provided via context menu 236 can be applied to single assets as well.

CONCLUSION

Certain of the embodiments disclosed herein address one or more shortcomings associated with existing animation timeline interfaces. For example, by enabling a user to work with an asset-based timeline—that is, a timeline that can be focused on motion effects associated with a single asset or a selected subset of assets—the resulting timeline interface can be greatly simplified and made easier to understand. The user can easily see which motion effects are associated with a given animation asset by simply selecting the asset from the animation canvas. Simplifying the animation timeline makes it feasible and easy to manipulate the displayed motion placeholders to achieve a desired animation effect. Furthermore, predefining frequently used motion effects, and providing access to such effects via a motion effect repository pane makes it easy to apply such effects to a selected animation asset. In particular the sequential structure of the motion effect repository pane and motion effect setting pane disclosed herein provides users with the ability to edit motion descriptions in a clear and focused way. Moreover, while certain embodiments provide a simplified asset-based animation timeline, in other embodiments a thorough timeline listing all assets provided within an animation production can still be made accessible, such as through a particular gesture. For example, in one embodiment a complete timeline can be accessed by gesturing with a long swipe inward from an edge of the touch sensitive display that is adjacent to the timeline pane.

Another advantage of certain of the embodiments disclosed herein is the ability to replace conventional key frame controls with a simplified group of motion effect controls, such as illustrated in FIG. 2F. This allows a motion effect to be manipulated based using dedicated controls that exist outside the animation timeline itself. Because they are independent of the timeline, such dedicated controls can be made larger and therefore lend themselves to a touch based user interface. This is not the case with existing key frame controls which reside in an animation timeline, and which therefore tend to be too small for implementation using a touch sensitive surface.

Numerous variations and configurations will be apparent in light of this disclosure. For instance, one example embodiment of the present invention provides an animated asset manipulation method that comprises displaying a plurality of visual assets on an animation canvas. The method further comprises displaying an animation timeline adjacent to the animation canvas. The method further comprises receiving a first selection of a first visual asset displayed on the animation canvas. The method further comprises, in response to the first selection, displaying one or more motion placeholders in the animation timeline, at least one of which corresponds to a first time period during which a first motion effect will be applied to the first visual asset. The method further comprises receiving a second selection of a second visual asset displayed on the animation canvas. The method further comprises, in response to the second selection, removing the one or more motion placeholders associated with the first visual asset and displaying one or more motion placeholders in the animation timeline, at least one of which corresponds to a second time period during which a second motion effect will be applied to the second visual asset. In some cases the method further comprises (a) in response to the first selection, displaying a thumbnail representation of the first visual asset in an asset index pane; and (b) in response to the second selection, removing the thumbnail representation of the first visual asset from the asset index pane and displaying a thumbnail representation of the second visual asset in the asset index pane. In some cases receiving the first selection of the first visual asset comprises receiving a selection of a plurality of visual assets displayed on the animation canvas. In some cases the method further comprises (a) receiving a selection of one of the motion placeholders displayed in the animation timeline; and (b) displaying a motion effect repository pane in response to the selection of one of the motion placeholders displayed in the animation timeline, the motion effect repository pane providing links to one or more motion effects which are available to be applied to the visual asset corresponding to the selected motion placeholder. In some cases the first and section selections are received via a touch sensitive surface which is used to display the animation canvas and the animation timeline. In some cases, in response to the first selection a new motion placeholder is displayed in the animation timeline, the new motion placeholder providing a link that, when selected causes a motion effect repository pane to be displayed. In some cases (a) in response to the first selection a new motion placeholder and an existing motion placeholder are displayed in the animation timeline, the existing motion placeholder corresponding to a previously-defined motion effect associated with the first visual asset; and (b) selection of either the new motion placeholder or the existing motion placeholder causes a motion effect repository pane to be displayed. In some cases the method further comprises (a) receiving an instruction to add a new visual asset to the animation canvas; and (b) in response to receipt of the instruction, displaying a new motion placeholder in the animation timeline that corresponds to a third time period during which a new motion effect will be applied to the new visual asset. In some cases the method further comprises (a) receiving an instruction to add a new visual asset to the animation canvas; and (b) in response to receipt of the instruction, removing one or more existing motion placeholders from the animation timeline and displaying a new motion placeholder in the animation timeline that corresponds to a third time period during which a new motion effect will be applied to the new visual asset.

Another example embodiment of the present invention provides a visual asset manipulation system that comprises a timeline display module configured to display one or more motion placeholders on an animation timeline. The system further comprises a motion selection module configured to display a motion effect repository pane in response to selection of a motion placeholder from the animation timeline, the motion effect repository pane providing links to one or more motion effects which are available to be applied to a visual asset corresponding to the selected motion placeholder. The system further comprises a motion definition module configured to display a motion effect settings pane in response to selection of a motion effect from the motion effect repository pane, the motion effect settings pane providing one or more controls which manipulate how the selected motion effect is applied to the visual asset. In some cases the system further comprises a touch sensitive display upon which the animation timeline, the motion effect repository pane, and the motion effect settings pane are displayed. In some cases the system further comprises an application user interface configured to display an animation canvas that includes a plurality of visual assets, wherein the one or more motion placeholders displayed on the animation timeline are associated with a visual asset selected from the animation canvas. In some cases the system further comprises an application user interface configured to display an animation canvas that includes a plurality of visual assets, wherein the one or more motion placeholders displayed on the animation timeline correspond to only one of the plurality of visual assets included on the animation canvas. In some cases the motion definition module is configured to display the motion effect settings pane in a region previously occupied by the motion effect repository pane. In some cases the system further comprises an application user interface configured to display an animation canvas and an asset index pane, the asset index pane configured to display thumbnail representations of a plurality of visual assets selected from the animation canvas.

Another example embodiment of the present invention provides a non-transitory computer readable medium having instructions encoded thereon that, when executed by one or more processors, causes an asset-based timeline interface process to be carried out. The process comprises displaying a plurality of visual assets on an animation canvas. The process further comprises displaying an animation timeline. The process further comprises receiving a first selection of a first visual asset displayed on the animation canvas. The process further comprises, in response to the first selection, displaying one or more motion placeholders in the animation timeline that correspond to a first time period during which a first motion effect will be applied to the first visual asset. The process further comprises receiving a second selection of a second visual asset displayed on the animation canvas. The process further comprises, in response to the second selection, removing the one or more motion placeholders associated with the first visual asset and displaying one or more motion placeholders in the animation timeline that correspond to a second time period during which a second motion effect will be applied to the second visual asset. In some cases the first visual asset is selected from a group consisting of a raster image, a vector image, a textual object, and an animated object. In some cases the first and second time periods are at least partially overlapping. In some cases the animation timeline is displayed adjacent to the animation canvas. In some cases the animation canvas and the animation timeline are displayed on a touch sensitive surface that is also used to receive the first and second selections.

The foregoing description of the embodiments of the invention has been presented for the purposes of illustration and description. It is not intended to be exhaustive or to limit the invention to the precise from disclosed. Many modifications are variations are possible in light of this disclosure. It is intended that the scope of the invention be limited not by this detailed description, but rather by the claims appended hereto.

What is claimed is:

1. An animated asset manipulation method comprising:
   displaying a plurality of visual assets on an animation canvas;
   displaying an animation timeline adjacent to the animation canvas;
   receiving a first selection of a first visual asset displayed on the animation canvas;
   in response to the first selection, displaying one or more motion placeholders in the animation timeline, at least one of which corresponds to a first time period during which a first motion effect will be applied to the first visual asset;
   receiving a second selection of a second visual asset displayed on the animation canvas; and
   in response to the second selection, removing the one or more motion placeholders associated with the first visual asset and displaying one or more motion placeholders in the animation timeline, at least one of which corresponds to a second time period during which a second motion effect will be applied to the second visual asset;
   wherein the first and second selections are received via a touch sensitive surface which is used to display the animation canvas and the animation timeline.

2. The method of claim 1, further comprising:
   in response to the first selection, displaying a thumbnail representation of the first visual asset in an asset index pane; and
   in response to the second selection, removing the thumbnail representation of the first visual asset from the asset index pane and displaying a thumbnail representation of the second visual asset in the asset index pane.

3. The method of claim 1, wherein receiving the first selection of the first visual asset comprises receiving a selection of a plurality of visual assets displayed on the animation canvas.

4. The method of claim 1, further comprising:
   receiving a selection of one of the motion placeholders displayed in the animation timeline; and
   displaying a motion effect repository pane in response to the selection of one of the motion placeholders displayed in the animation timeline, the motion effect repository pane providing links to one or more motion effects which are available to be applied to the visual asset corresponding to the selected motion placeholder.

5. The method of claim 1, wherein, in response to the first selection a new motion placeholder is displayed in the animation timeline, the new motion placeholder providing a link that, when selected causes a motion effect repository pane to be displayed.

6. The method of claim 1, wherein:
   in response to the first selection a new motion placeholder and an existing motion placeholder are displayed in the animation timeline, the existing motion placeholder corresponding to a previously-defined motion effect associated with the first visual asset; and
   selection of either the new motion placeholder or the existing motion placeholder causes a motion effect repository pane to be displayed.

7. The method of claim 1, further comprising:
   receiving an instruction to add a new visual asset to the animation canvas; and
   in response to receipt of the instruction, displaying a new motion placeholder in the animation timeline that corresponds to a third time period during which a new motion effect will be applied to the new visual asset.

8. The method of claim 1, further comprising:
receiving an instruction to add a new visual asset to the animation canvas; and
in response to receipt of the instruction, removing one or more existing motion placeholders from the animation timeline and displaying a new motion placeholder in the animation timeline that corresponds to a third time period during which a new motion effect will be applied to the new visual asset.

9. A visual asset manipulation system comprising a memory device and a processor that is operatively coupled to the memory device, wherein the processor is configured to execute instructions stored in the memory device that, when executed, cause the processor to carry out a visual asset manipulation process that includes:
displaying one or more motion placeholders on an animation timeline;
displaying a motion effect repository pane in response to selection of a motion placeholder from the animation timeline, the motion effect repository pane providing links to one or more motion effects which are available to be applied to a visual asset corresponding to the selected motion placeholder; and
displaying a motion effect settings pane in response to selection of a motion effect from the motion effect repository pane, the motion effect settings pane providing one or more controls which manipulate how the selected motion effect is applied to the visual asset.

10. The system of claim 9, further comprising a touch sensitive display upon which the animation timeline, the motion effect repository pane, and the motion effect settings pane are displayed.

11. The system of claim 9, wherein the visual asset manipulation process further includes displaying an animation canvas that includes a plurality of visual assets, wherein the one or more motion placeholders displayed on the animation timeline are associated with a visual asset selected from the animation canvas.

12. The system of claim 9, wherein the visual asset manipulation process further includes displaying an animation canvas that includes a plurality of visual assets, wherein the one or more motion placeholders displayed on the animation timeline correspond to only one of the plurality of visual assets included on the animation canvas.

13. The system of claim 9, wherein the visual asset manipulation process further includes displaying the motion effect settings pane in a region previously occupied by the motion effect repository pane.

14. The system of claim 9, wherein the visual asset manipulation process further includes displaying an animation canvas and an asset index pane, the asset index pane configured to display thumbnail representations of a plurality of visual assets selected from the animation canvas.

15. A non-transitory computer readable medium having instructions encoded thereon that, when executed by one or more processors, causes an asset-based timeline interface process to be carried out, the process comprising:
displaying a plurality of visual assets on an animation canvas;
displaying an animation timeline;
receiving a first selection of a first visual asset displayed on the animation canvas;
in response to the first selection, displaying one or more motion placeholders in the animation timeline that correspond to a first time period during which a first motion effect will be applied to the first visual asset;
receiving a second selection of a second visual asset displayed on the animation canvas; and
in response to the second selection, removing the one or more motion placeholders associated with the first visual asset and displaying one or more motion placeholders in the animation timeline that correspond to a second time period during which a second motion effect will be applied to the second visual asset.

16. The non-transitory computer readable medium of claim 15, wherein the first visual asset is selected from a group consisting of a raster image, a vector image, a textual object, and an animated object.

17. The non-transitory computer readable medium of claim 15, wherein the first and second time periods are at least partially overlapping.

18. The non-transitory computer readable medium of claim 15, wherein the animation timeline is displayed adjacent to the animation canvas.

19. The non-transitory computer readable medium of claim 15, wherein the animation canvas and the animation timeline are displayed on a touch sensitive surface that is also used to receive the first and second selections.

* * * * *